Nov. 7, 1967  B. L. SUGAR  3,350,827
BUILDING PANELS AND METHOD OF MOUNTING THE PANELS
Filed Jan. 2, 1964  3 Sheets-Sheet 1

INVENTOR.
BEN L. SUGAR
BY
ATTORNEY

Nov. 7, 1967  B. L. SUGAR  3,350,827
BUILDING PANELS AND METHOD OF MOUNTING THE PANELS
Filed Jan. 2, 1964  3 Sheets-Sheet 2
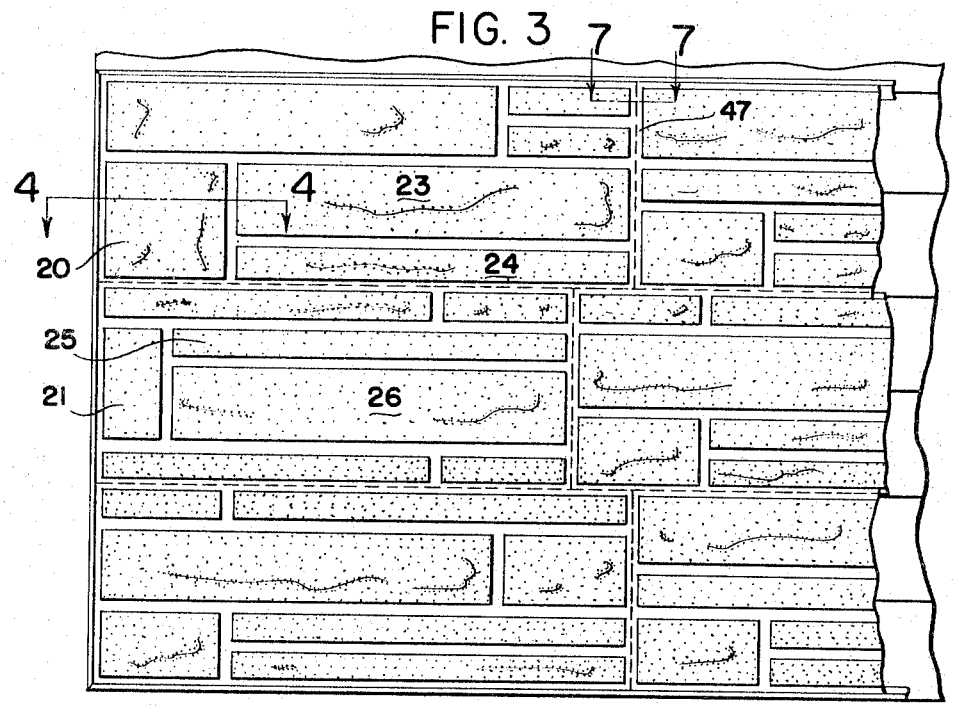
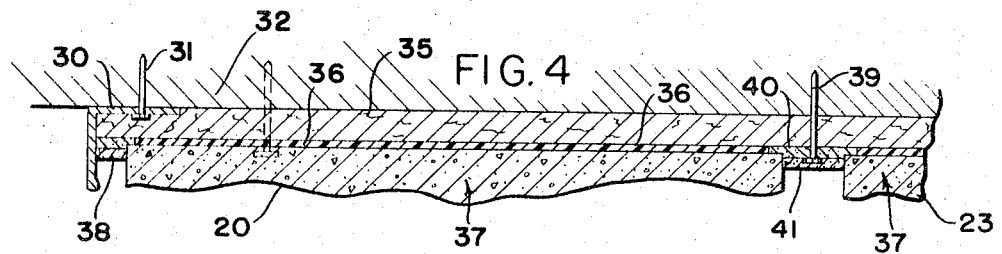
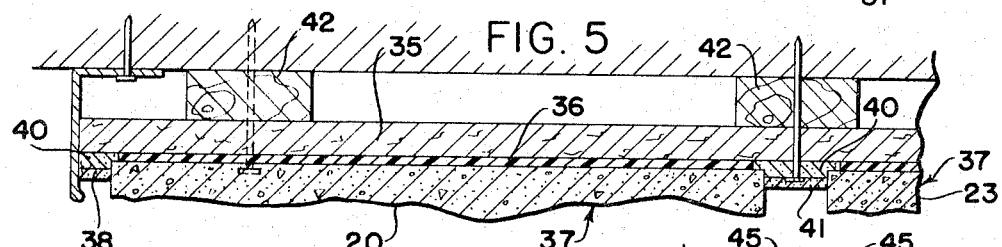
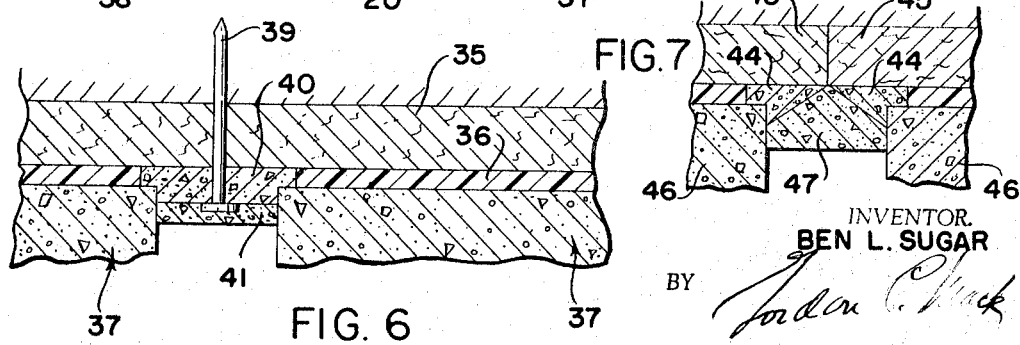
INVENTOR.
BEN L. SUGAR
BY
ATTORNEY

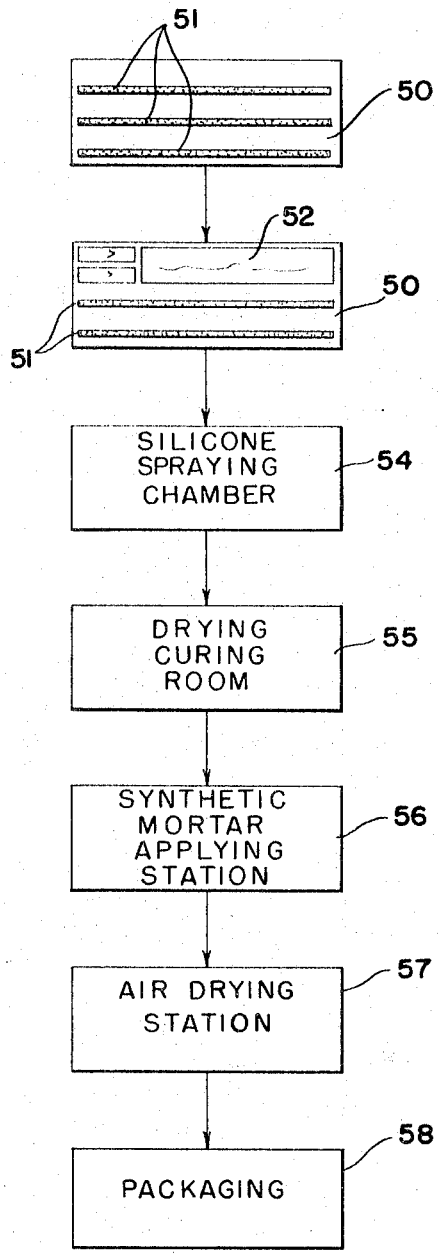
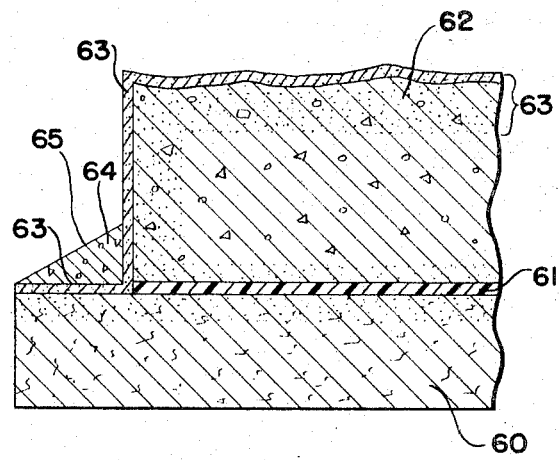

United States Patent Office

3,350,827
Patented Nov. 7, 1967

3,350,827
BUILDING PANELS AND METHOD OF
MOUNTING THE PANELS
Ben L. Sugar, Akron, Ohio, assignors to Ridge Rock Industries, Inc., Sebring, Ohio, a corporation of Ohio
Filed Jan. 2, 1964, Ser. No. 335,174
6 Claims. (Cl. 52—309)

This invention relates to a building panel surfaced with rectangular building elements of artificial stone or the like, to be used for both outside and inside construction, and includes the method of producing it and its use.

The artificial stone includes aggregate, cement, pigment colors and the like, and is produced in different colors and different shades of the same color. It is of veneer thickness and has a smooth undersurface but an uneven outer surface which simulates natural stone, the thickness varying from about ½ inch to one inch, although it may be somewhat thicker or thinner. This artificial stone is pervious to rain until treated with silicon as described herein. The stone veneer is adhered to a long-fiber fiberboard by adhesive alone.

Each panel comprises a number of artificial-stone elements, and between and around the several elements the fiberboard is covered with motar, a synthetic motar being used in the preferred embodiment of the invention. The mortar is also utilized to cover the dividing line between the several units, and also to cover the heads of nails used in applying the panels to a supporting structure. The panel is used inside and/or outside of a building, both in producing new construction as well as in applying a new front to old construction. Although ordinarily the panels are nailed to the supporting structure they may be applied by adhesive or other means. If nailed, the nail heads are covered by mortar. The entire exposed surface of the panel is preferably covered with silicone to resist rain, weathering and dust and dirt collection, etc., and to make the surface easier to clean. The panel is assembled at the manufacturing plant and shipped in completed condition, preferably with the silicone coating applied, to the site of installation.

THE PANEL PATTERN

The invention comprises a new panel pattern of artificial-stone elements. The panel itself is rectangular, either square or elongated. The artificial-stone elements may be of any shape, but are preferably rectangular, either square or elongated; and attractive designs are composed by using both elongated and square rectangular elements of varying dimensions.

The preferred pattern for an elongated panel is composed from five to a dozen rectangular artificial-stone elements each at least one inch wide and preferably about two or more inches wide, and from four to as much as twenty or twenty-four or more inches long. A usual size for the panels is 14 x 32 inches or 12¼ x 32 inches. A preferred pattern comprises elements of different widths and lengths: and usually includes a wider and preferably relatively square element with a number of elongated elements aligned therewith, the elongated elements themselves often being of different widths. The elements are arranged on the panel in such a way as to produce broken vertical lines and broken horizontal lines so that when the various panels are applied to a flat surface the dividing lines between the panels are not easily discerned.

In a preferred pattern, artificial-stone elements of different widths and lengths are employed, each of the elements being roughly an even number of units wide—such as one, two or three units—and in the panel these elements are of different lengths. Usually, none of the elements extends the whole length of the panel, and the panel comprises an element which is several widths wide in line with a plurality of elements each of lesser width. Thus the panel may be, for example three to eight, and preferably five elements wide, and although the panel may include only one relatively short and substantially square element, it often includes two such short elements each in line with a different plurality of elements of lesser width. The pattern will be discussed more particularly in connection with the drawings.

In using the panels it is customary to use panels employing different designs adjacent one another, and repetition of the design effect produced by any one pattern may be altered by merely reversing one of two substantially identical panels so that stone members which are above in one of the panels are below in the other panel. Thus, variegated designs having an attractive over-all appearance can be built up from a relatively few basic designs.

In packaging the panels at the factory, each package preferably contains a plurality of different patterns such as, for example, five different patterns, which are applied at the installation in a random manner and individual panels are reversed on occasion so that generally there are no like patterns adjacent one another.

THE PANEL CONSTRUCTION

Building panels are not new. The attachment of artificial stone to a panel backing has been accomplished by various methods. Krauss 1,853,823 refers to surface attachment of building elements to a panel backing as being unsatisfactory because the elements become loosened and in some cases detached from the backing and, therefore, utilizes metallic anchoring means to anchor the elements to the backing.

The elements of this invention are adhered to the backing by an adhesive, and with the proper adhesive such surface attachment alone is employed and has been found satisfactory. The preferred adhesive used is a curable styrene-butadiene copolymer rubber and hydrocarbon-resin composition with rosin-type tackifiers sold by The Firestone Tire & Rubber Company under the name Loxite 602–647. This is a GR-S-based adhesive containing approximately 60 percent solids by weight. The remainder (40 percent) is a blend of toluene and naphtha-type solvents. The solvent can be varied to give faster or slower drying without changing the adhesive properties. On the solids base this adhesive contains 10.7 percent GR-S-type polymers, 17.8 percent hydrocarbon resins, 7.0 percent rosin-type tackifiers, 2.5 percent hydrocarbon oils and 62.0 percent inert fillers. It has a specific gravity of 1.145 and a Brookfield viscosity (HBF model Brookfield viscosimeter—#5 spindle, at 77–80° F.) of:

600,000 to 1,000,000 cps. at 1 r.p.m.
300,000 to 525,000 cps. at 2 r.p.m.
130,000 to 220,000 cps. at 5 r.p.m.
68,000 to 110,000 cps. at 10 r.p.m.

The adhesive after curing makes a relatively tight moisture-vapor barrier. Therefore, in applying the adhesive only a limited area of each panel is covered. The adhesive is usually applied from an extruder, and may be applied in stripes, or by separate dots of any desired size, or in any pattern that leaves substantial bare areas to provide adequate permeability of moisture-vapor. The elements on a single panel are usually not all of the same color, the colors of the different elements simulating different usual stone colorings.

The panel backing is a long-fiber composition board rather than a board made of granulated materials, and because of this has high shear strength such that the panels are not easily broken due to failure of the backing. The backing is usually not over an inch thick and is preferably about ½ to ¾ inch thick. Its composition is such that the face to which the building elements are applied is absorbent and penetrated to a substantial depth by the adhesive. The artificial-stone elements are also penetrated, but to a lesser extent by the adhesive. The backing and stone, if they are to be used outside, are waterproofed, preferably with silicone. A preferred backing is ½-inch Celotex manufactured by Celotex Corporation.

In adhering the stone elements to the backing by the adhesive, the elements are spaced from one another a distance equal to that usually employed when stones are built up one upon another, the vertical spacing being approximately ⅜ inch and the lateral spacing usually being somewhat more. Usually no spacing is over about ¾ inch. The individual lateral and vertical spacings of the elements on a single panel are usually not uniform, giving an impression of irregularity.

The bottom of the spaces between the elements is filled at the factory to a depth of about ⅛ inch with a mortar. Thus the elements themselves protrude from the mortar covering and create a desirable three-dimensional effect which adds to the appearance of the finished product. Such mortar also covers the surface of the backing around the elements, and this is beveled along the entire perimeter of the panel.

If Portland-cement mortar is used in the spaces between the elements, the panel product must be handled with great care because if shipped by ordinary transportation means and subjected to ordinary handling the mortar will crack. Furthermore, the preferred method of applying the panel to its support is by nailing it to wood, brick, or other backing, and nails being driven through areas mortared with Portland-cement mortar crack the mortar. The preferred mortar, therefore, is a mortar which comprises a resin (synthetic or natural) adhesive bonding the various mineral and other components which may include asbestos fiber, oils and silica sand. Volatile solvent is included to facilitate rapid drying. Such mortar, when used in the spaces between the elements, forms a strong bond with both the backing and contacted edges of the elements. It retains its high adhesive characteristics over a prolonged period of time and remains flexible almost indefinitely, so that it has long life. Resin adhesives are usually waterproof and impermeable to moisture vapor, and this adds to the life of the mortar. A suitable mortar composition is composed of vinyl resin, drying oils and sand filler, and has the following composition:

| Vehicle: | Percent |
| --- | --- |
| Linseed oil | 30 |
| Soya bean oil | 30 |
| Vinyl resin | 1.5 |
| Aromatic and aliphatic spirits | 34.5 |
| Chlorinated paraffin | 4 |
| Fillers: | |
| Silica sand | 96 |
| Inert pigments | 4 |
| Total Composition: | |
| Vehicle solids | 13.7 |
| Pigments and fillers | 77 |
| Volatiles | 9.3 |

THE ASSEMBLY OF THE PANEL

The panel is assembled in complete form at the factory. The adhesive is preferably applied only to the fiberboard backing, and in limited areas only, to provide other areas of the panel with moisture-vapor permeable characteristics. The adhesive may, for example, be extruded in spaced ribbons. These may extend the entire length of the panels, but preferably the edges of the panel surrounding the stones are not covered with adhesive; the mortar is thus applied directly to the panels. The stone elements are then applied in a desired pattern, with the interface between each element and the panel comprising substantial areas in which there is no adhesive, and the adhesive is then dried (if necessary) and cured (if necessary).

The panel with the elements attached is preferably then coated with a silicone which makes the element surfaces waterproof and more easily cleaned. It prevents the artificial stone from crazing and cracking, especially when subjected to weathering. It also retards the bleaching of the coloring pigments. The synthetic mortar is preferably applied after the silicone treatment in order to insure that the silicone treatment covers the entire edges of the artificial-stone elements down to the fiberboard, and also the fiberboard surface which is exposed between the elements themselves to improve the adhesive bond of the mortar to the fiberboard and stone. However, it is not necessary to treat the fiberboard surface with silicone.

The invention is further described in connection with the accompanying drawings, in which:

FIGURE 3 is a front elevation of a wall illustrating the application of a number of panels;

FIGURE 4 is a section on the line 4—4 of FIGURE 3;

FIGURE 5 shows the application of panels directly to studs;

FIGURE 6 is an enlarged detail showing a panel nailed to a surface with the head of the nail covered with mortar;

FIGURE 7 is a section on the line 7—7 of FIGURE 3;

FIGURE 8 is a flow sheet which illustrates the steps in the manufacture of a panel; and FIGURE 9 is an enlarged sectional view illustrating the penetration of the different panel components by the adhesive and the silicone.

Figure 1:
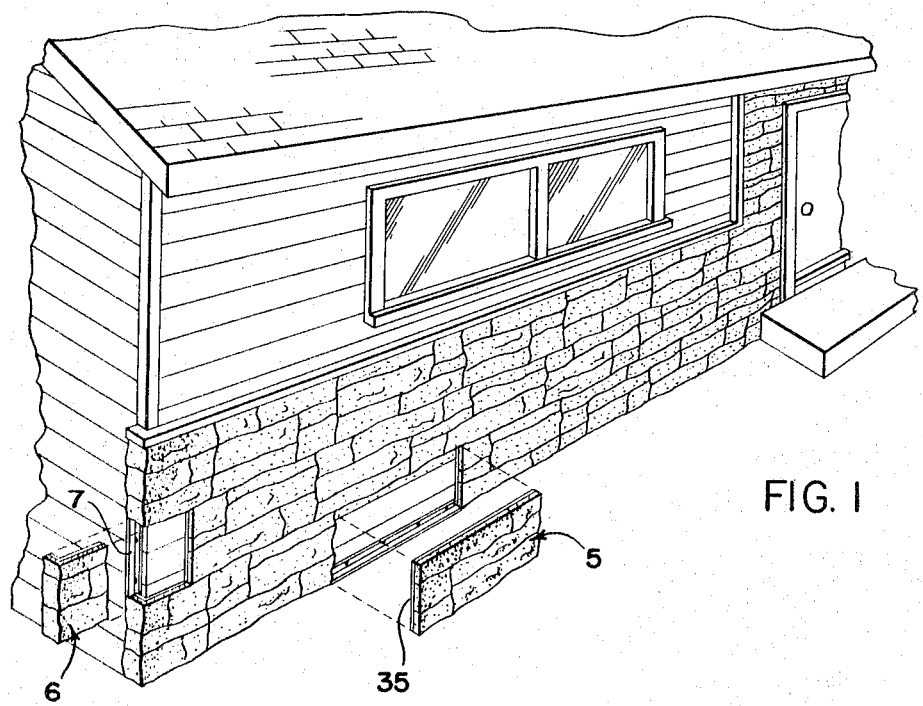
FIGURE 1 illustrates the application of the panels to the bottom portion of the front of a building, with one of the panels projected forwardly and one projected to the side.

The panels may cover the whole or only part of the outer surface of a building, and may be used for interior wall surfaces. FIGURE 1 illustrates a flat panel 5 projected forwardly from the front of a building a part of which is covered with panels, and a corner panel 6 projected to the side to show the relative areas covered by such panels and to show the corner structure under the stone front which includes the metal trim 7.

Figure 2:
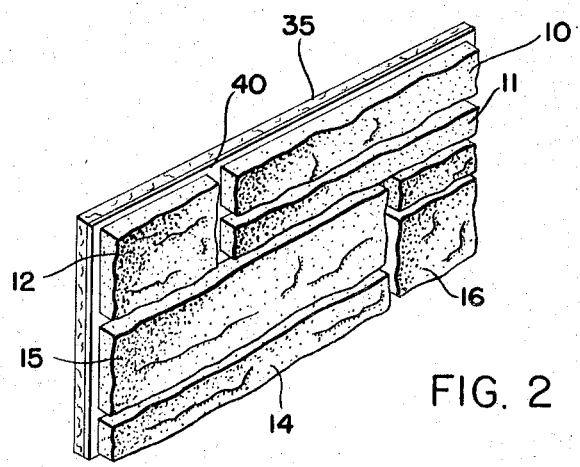
FIGURE 2 is a perspective view of a panel.

FIGURE 2 shows a single panel in perspective. It illustrates the effect of using two elongated stone elements 10 and 11 of substantially the same width beside one wider, substantially square element 12, and two elongated stone elements 14 and 15 of different widths beside a single wider, substantially square element 16. The spaces between the elements are not all of the same width. FIGURE 3 is an elevation which shows a number of attractive panel designs. Shorter, wider elements, such as those designated 20, 21 are located at opposite edges of the panel in line with a plurality of narrower elements 23, 24, 25, 26. The shorter element may be relatively square, as is element 20. The narrower elements are of different widths. Using only a few such designs, an entire wall can be covered without there appearing to be any repetition of the panel designs, particularly if about half of the panels of each design are reversed.

The panels are preferably attached to a wall surface by nails. This wall surface may be an old clapboard surface. FIGURE 4 is an enlarged detail showing an abutting trim 30 nailed with a nail 31 to the wall 32. The panel comprises fiberboard backing 35, adhesive 36, and stone elements 37. The panel is placed against the trim and the space between the trim and the panel is then filled (generally full) with mortar 38. There are usually about ten nails in each panel. Only one such nail 39 is illustrated in full lines in FIGURE 4, this nail being located on the line 4—4 of FIGURE 3. The nail is preferably not countersunk into the mortar 40 but is driven flush with the surface and then a dab of mortar 41 is placed over the nail head and this is then generally smoothed over to a crown or relatively flat surface.

In new construction such as illustrated in FIGURE 5, the nail is driven into studs 42 or furring strips instead of into a wall surface.

FIGURE 6 is an enlarged detail of the nailed area of the construction shown in FIGURE 4.

As shown in FIGURE 7, the mortar 44 is preferably beveled around the perimeter of the panel on the fiberboards 45 between the stone elements 46. When two panels are brought into abutting relation, a bead 47 of the mortar in placed in the groove formed by the beveled edges, and then smoothed over to form a seal.

FIGURE 8 is a flow sheet showing the flow of materials in the process of manufacture, and indicating the various process steps. First, adhesive is applied to limited areas of the surface of the fiberboard 50, providing intervening areas for moisture-vapor transmission through the panel. The adhesive-covered areas are illustrated in FIGURE 8 as ribbons 51. After applying the adhesive, the artificial-stone elements 52 are put in place, and after the panel has been covered with such elements the entire panel is given a silicone treatment in the silicone-spray chamber 54. From this chamber the panel passes into the drying and/or curing room 55. In the next step the panels go to the mortar-applying station 56 where mortar is applied between the blocks and around their periphery, and the mortar at the perimeter is beveled. The panels are then placed on air-drying racks and sent to an air-drying station 57 where they are allowed to dry and the mortar sets. The panels are then packaged at station 58.

FIGURE 9 is an enlarged view of a portion of a finished panel of preferred structure, showing the fiberboard 60 to which adhesive 61 has been applied. The adhesive penetrates the fiberboard to a depth up to ⅛ inch, and it penetrates the stone to a lesser depth. The artificial-stone elements, such as the elements 62, are placed on this. Then the silicone is applied. Many silicones are on the market and recommended for such use. A suitable silicone is a soluble water-repellent resin such as that sold as Dow Corning 770, the general chemical composition being:

Resin solids, percent (after 3 hours at
  135° C.) _____ 33.
Solvent (xylene) _____ 67.
Suggested thinner _____ Mineral spirits.
Color _____ Water white.
Viscosity at 77° F., centipoises _____ 5.
Specific gravity at 77° F. _____ 0.96.
Flash point, greater than _____° F.__ 81.
Curing time, hours at 77° F. _____ 24.

The thinned coating composition should have a resin content of about 3 to 5 percent. The different available silicone compositions can be used in suitable concentrations, etc.

The effect of this silicone treatment is indicated in FIGURE 9. It covers the stone at 63 and also penetrates the stone to a distance of up to ¼ inch on the top and edges. The silicone also covers the fiberboard, both the portion covered with adhesive 61 and that not covered with adhesive. The adhesive may extend to the edge of the fiberboard, but preferably does not extend beyond the edge of the stone element 62. The adhesive penetrates the stone and fiberboard to a depth of a small fraction of an inch. After the panels have passed through the drying and/or curing ovens, the mortar 64 is applied between the stone elements and around their edges, and the perimeter of the panel is beveled at 65 for the purpose heretofore explained.

The invention is covered in claims which follow.

What I claim is:

1. A pre-fabricated, elongated, rectangular building panel composed of a backing, rectangular building elements adhered to one face of the backing with mortar covering the surface of the backing between and around the elements to only a part of the depth of the building elements, with the mortar beveled downwardly at the perimeter of the panel so as to be thinner at the edge of the panel than adjacent the elements.

2. Two panels as defined in claim 1 abutting one another with the groove formed by adjoining beveled areas filled with mortar.

3. The method of mounting a building panel onto a building support, the panel comprising a backing and decorative units adhered thereto by adhesive means which method comprises applying mortar between and around the units, the mortar being composed of solid particles adhered to one another by a resinous material whereby it is nonfrangible, driving nails through the mortar and the backing into the building support.

4. The method of claim 3 in which a plurality of nails are used and the nail heads are covered with mortar.

5. A building panel composed of building elements on a backing, areas of the backing between the elements being covered by a nailable mortar composed of vinyl resin, drying oils and sand filler.

6. The method of forming a building panel which comprises adhering building elements to a fiberboard backing, covering the entire exposed surface of the elements and backing with silicone, and then applying between and around the elements a mortar composed of components adhered to one another by a resinous adhesive.

References Cited

UNITED STATES PATENTS

| | | | |
|---|---|---|---|
| 1,699,351 | 1/1929 | Fenberg | 52—315 |
| 1,963,966 | 6/1934 | Bennett | 52—509 |
| 2,088,052 | 7/1937 | Ensminger | 106—228 |
| 2,114,451 | 4/1938 | Mattes | 52—314 X |
| 2,130,911 | 9/1938 | Teunon | 52—315 |
| 2,266,510 | 12/1941 | Pottinger | 52—315 X |
| 2,298,983 | 10/1942 | Stabe | 52—384 |
| 2,572,252 | 10/1951 | Erasmus | 106—148 |
| 2,683,674 | 8/1950 | Hatcher | 52—515 X |
| 2,718,674 | 9/1955 | Hinds | 52—314 |
| 2,877,130 | 3/1959 | Caron | 106—228 |
| 2,995,534 | 8/1961 | Adams | 260—23 |
| 3,045,396 | 7/1962 | Matyas | 52—384 X |
| 3,085,482 | 4/1963 | Yakubik | 52—390 |
| 3,103,858 | 10/1963 | Cranford | 52—309 |
| 3,131,514 | 5/1964 | Siek | 52—315 |
| 3,177,279 | 4/1965 | Bilodeau | 52—309 |

JOHN E. MURTAGH, *Primary Examiner.*